Jan. 30, 1940.   N. L. MOCHEL   2,188,664
VALVE STEM PACKING
Filed Nov. 27, 1937
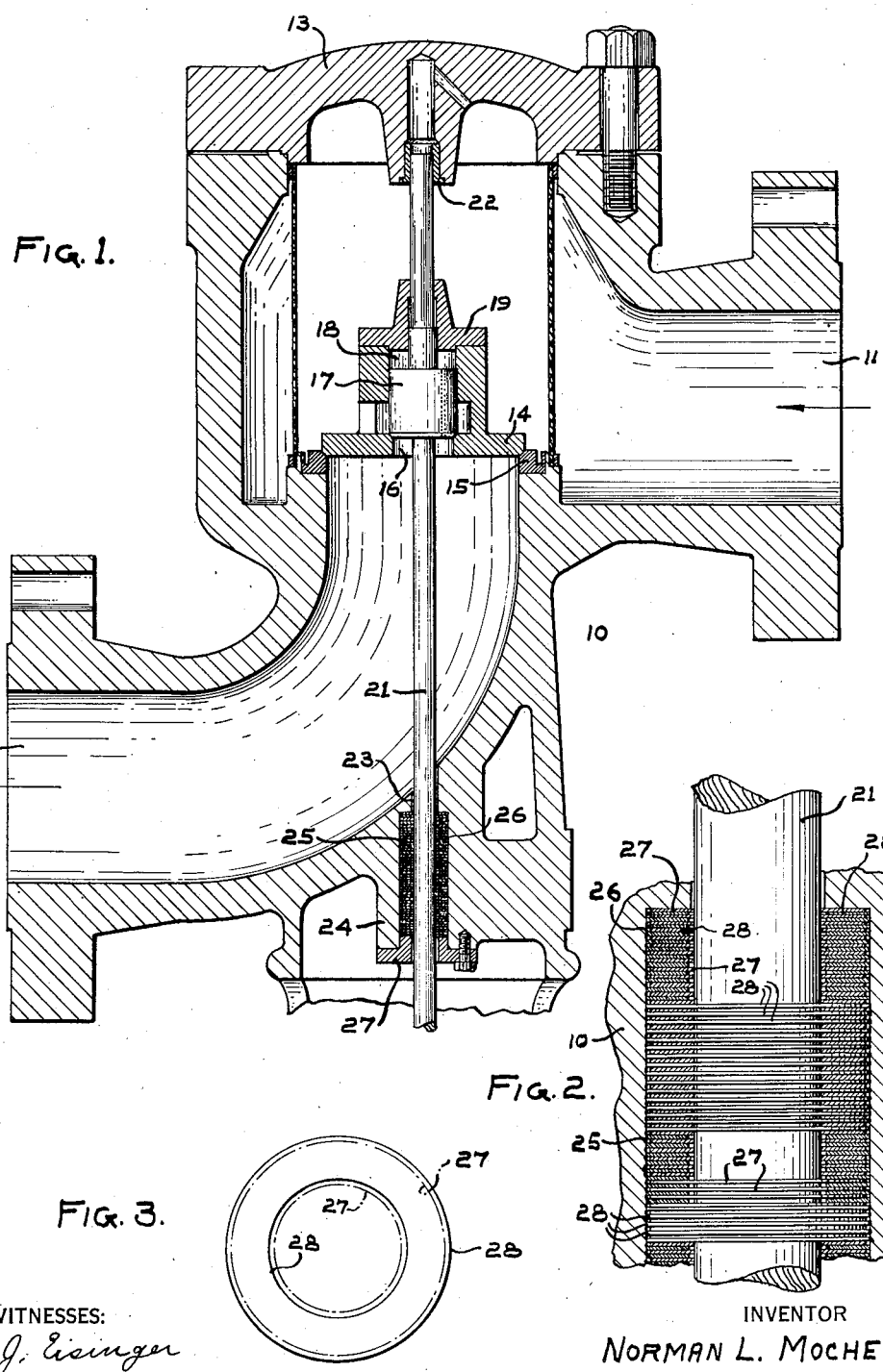
INVENTOR
NORMAN L. MOCHEL.
BY
ATTORNEY Patented Jan. 30, 1940

2,188,664

UNITED STATES PATENT OFFICE 2,188,664

VALVE STEM PACKING

Norman L. Mochel, Ridley Park, Pa., assignor to Westinghouse Electric & Manufacturing Company, East Pittsburgh, Pa., a corporation of Pennsylvania Application November 27, 1937, Serial No. 176,908

2 Claims. (Cl. 286—33)

My invention relates to a valve for controlling the flow of high pressure, high temperature fluid, particularly to a packing or bushing for the stem of such a valve, and it has for an object to provide an improved packing.

Another object is to provide a packing or bushing of increased effectiveness in preventing the escape of steam around the valve stem.

A further object is to provide a packing or bushing which is both simple in construction and durable.

The bushing of my invention comprises a stack of thin metallic washers of alternately smaller and greater inside diameter, the smaller inside diameter being substantially equal to the diameter of the valve stem, so that the stem can just slide therethrough but so that leakage of fluid is minimized. The intervening washers of greater inside diameter provide grooves in which foreign matter may lodge. Hence, the danger of galling is greatly diminished.

The washers of smaller inside diameter are preferably also of smaller outside diameter to permit some sliding of these washers, which bear the rubbing load.

The above recited and other objects are effected by my invention as will be apparent from the following description and claims taken in connection with the accompanying drawing, forming a part thereof, in which:

Fig. 1 is a longitudinal sectional view of a high pressure valve showing my improved packing applied thereto;

Fig. 2 is an enlarged sectional view showing my invention more in detail; and

Fig. 3 is an enlarged plan view of one of the larger elements which make up the packing, and having the dimensions of one of the smaller elements indicated thereon.

Referring now to the drawing in detail, I show my invention embodied in a throttle valve which is adapted, for example, to control the flow of steam to a steam turbine, particularly steam at high pressure and high temperature, for example, 1200 lbs. per square inch and 900° F. The throttle valve proper is of usual construction, including a bonnet 10 having inlet and outlet openings 11 and 12 and a bonnet cover or closure member 13. The flow of steam through the valve bonnet 10 is controlled by a valve member 14 engaging a seat 15 in the bonnet 10. It will be noted that, when the valve is closed, the fluid pressure above the valve exerts a great force holding the valve member against its seat. In order to partially equalize the pressures above and below the valve member 14 to lift the same off its seat, the valve member 14 may be provided with a port 16 controlled by a pilot valve 17. The latter is in the form of a piston movable in a cylinder 18 formed on the valve member 14. A cover member 19, secured to the valve member 14, forms a closure for the upper end of the cylinder 18 and is adapted to be engaged by the piston 17 upon upward movement thereof.

The pilot valve 17 is rigidly connected to a valve stem 21, which is preferably made of a corrosion-resistant steel, such as stainless steel, and which may be integral with the pilot valve. The upper end of the valve stem 21 slides through a bushing 22 which serves as a guide for the valve stem.

The valve stem 21 extends through an opening 23 formed in the bonnet 10 and is connected to any suitable form of mechanism (not shown) for actuating the valve. The bonnet 10 is formed with a boss or projection 24 around the opening 23, and has formed therein a recess 25 in which packing 26 is disposed. The packing is retained in the recess by retaining member 27 bolted to the boss 24.

To open the valve, the valve stem 21 is moved upwardly so that the pilot valve 17 opens the port 16. Flow through the port 16 effects a partial equalization of pressure above and below the valve member 14. Upon continued upward movement, the pilot valve 17 abuts the cover member 19 carried by the valve member 14 and moves the latter upwardly to effect valve opening movement of the valve member 14.

The present invention relates to the packing 26, which comprises, as shown more fully in Figs. 2 and 3, a stack of thin metal plates or washers 27 and 28 arranged in alternate relation. I prefer to employ washers having a thickness of .010 inch. A different thickness may be employed, but in order to obtain the full benefits of the present invention, it should be not more than $\frac{1}{32}$ inch. While they may be made of any suitable metal adapted for high pressure, high temperature fluid, I prefer to make them of "stainless" or chromium steel containing molybdenum. The chromium content provides corrosion resistance.

The washers are formed with central circular openings for receiving the valve stem. The inner diameter of the washers 27 is substantially equal to the diameter of the valve stem, while the intervening washers 28 are of slightly greater internal diameter. For a valve stem of one inch diameter, for example, I prefer to provide washers 27 of 1.000 inch inner diameter and washers 28 of 1.010 inch diameter. The washers thus form a series of grooves about the valve stem.

The outer diameter of the washers 28 is substantially equal to the diameter of the recess 25 in the valve bonnet to provide a fluid-tight fit therebetween. The washers 27 are preferably of slightly smaller outer diameter. For example, the outer diameter of the washers 27 and 28 may be 1.740 inch and 1.750 inch, respectively, for the 1 inch valve stem. This permits some sliding of the washers 27, which bear the rubbing load. To provide for such sliding, the washers are coated with a film of graphite, applied in any suitable manner. Some of the excess graphite works its way into the grooves and some also works its way in between the inner edges of the washers 27 and the surface of the valve stem 21 to provide lubrication thereof.

In Fig. 3, I show one of the washers 28 in plan, and also indicate the dimensions of the washers 27 by dot and dash lines, so that the relative sizes of the washers 27 and 28 may be readily noted therefrom.

The series of grooves formed at the inner edges of the washers serves several purposes. Any foreign matter that finds its way between the packing and the stem is collected in these grooves. In prior constructions using solid bushings, it has been found that such foreign matter wedges between the bushing and the stem and frequently causes galling.

The provision of the large number of small annular grooves in the packing also provides a labyrinth type of seal, which seal is more effective in preventing leakage than a continuous surface.

In this construction, also, the edges of the relatively thin washers 27, spaced from each other by the larger washers 28, provide a small degree of flexibility, so that, if foreign particles become wedged in between said edges and the valve stem, said edges may yield.

Another advantage of my new packing is the advantageous relation of the directional properties of the metal parts. The fibers of the washers extend at right angles to the surface and the fibers in the valve stem 21, thereby greatly reducing the liability to seizing.

While I have shown my invention in but one form, it will be obvious to those skilled in the art that it is not so limited but is susceptible of various changes and modifications without departing from the spirit thereof and I desire, therefore, that only such limitations shall be placed thereupon as are imposed by the prior art or as are specifically set forth in the appended claims.

What I claim is:

1. The combination with a longitudinal movable stainless steel rod or stem and a member having an opening through which said rod extends, of packing for sealing against leakage of high temperature and high pressure fluid through said opening and along the rod and comprising a stack of thin metallic washers in the opening, each of said washers being of continuous annular formation and formed from chrome molybdenum steel, said stack comprising alternately arranged first and second washers, the first washers having openings conforming closely to the cross section of the stem or rod, and the second washers having openings which are larger than those of the first washers and whose bounding edges and the adjacent overlapping portions of the first washers provide annular grooves separated by the latter washers.

2. The combination with a movable stainless steel rod or stem and a member having a socket through which the rod or stem extends, of a packing for sealing against leakage of high temperature and high pressure fluid through said socket and along the rod or stem and comprising a stack of thin flexible metallic washers in the socket, each of said washers being of continuous annular formation and formed from chrome molybdenum steel, said stack comprising alternately arranged first and second washers, the first washers having openings closely conforming to the stem or rod and the second washers having larger openings whose bounding edges and the adjacent overlapping portions of the first washers provide annular grooves separated by the latter washers and the second washers having their peripheries closely fitting the socket wall and the first washers having their peripheries spaced inwardly from such wall in order that they may slide relatively to the second washers due to lateral pressures applied thereto by the rod or stem.

NORMAN L. MOCHEL.